United States Patent
Muyldermans et al.

(10) Patent No.: US 11,525,025 B2
(45) Date of Patent: Dec. 13, 2022

(54) BLOCK COPOLYMERS AND USES THEREOF

(71) Applicant: Kraton Polymers LLC, Houston, TX (US)

(72) Inventors: Xavier D. D. J Muyldermans, Mont Saint Guibert (BE); Marianne Stol, Amsterdam (NL); Martine Dupont, Mont Saint Guibert (BE); Koen Van Duin, Amsterdam (NL); Kato Hiroshi, Tokyo (JP); Neil Riddle, Almere (NL)

(73) Assignee: KRATON POLYMERS LLC, Houston, TX (US)

( * ) Notice: Subject to any disclaimer, the term of this patent is extended or adjusted under 35 U.S.C. 154(b) by 417 days.

(21) Appl. No.: 16/714,228

(22) Filed: Dec. 13, 2019

(65) Prior Publication Data
US 2020/0190244 A1    Jun. 18, 2020

Related U.S. Application Data

(60) Provisional application No. 62/779,515, filed on Dec. 14, 2018.

(51) Int. Cl.
| | |
|---|---|
| *C08F 297/04* | (2006.01) |
| *C08L 53/02* | (2006.01) |
| *B60C 1/00* | (2006.01) |
| *B60C 11/00* | (2006.01) |
| *C09J 153/02* | (2006.01) |

(52) U.S. Cl.
CPC ........ *C08F 297/046* (2013.01); *B60C 1/0016* (2013.01); *B60C 11/0008* (2013.01); *C08F 297/048* (2013.01); *C08L 53/02* (2013.01); *C09J 153/02* (2013.01); *B60C 2011/0025* (2013.01)

(58) Field of Classification Search
CPC .................................................. C08F 297/046
See application file for complete search history.

(56) References Cited

U.S. PATENT DOCUMENTS

| | | |
|---|---|---|
| 4,987,194 A | 1/1991 | Maeda et al. |
| 2019/0016842 A1 | 1/2019 | Kamei et al. |

FOREIGN PATENT DOCUMENTS

| | | |
|---|---|---|
| EP | 1474458 B1 | 10/2007 |
| WO | 2016/130630 A1 | 8/2016 |

*Primary Examiner* — Arrie L Reuther (57) ABSTRACT

A styrenic block copolymer having one or more polymer blocks A and one or more polymer blocks B is disclosed, where "A" is a poly(vinylaromatic) block having a molecular weight of greater than 5 kg/mol. The "B" block has a molecular weight of more than 15 kg/mol, and comprises polymerized 1,3-diene units and vinylaromatic units, wherein the polymerized vinylaromatic units represent 5-40 wt. % of the overall weight of the block "B". The polymerized 1,3-diene units comprise more than 80 wt. % of polymerized isoprene units in which 45-80 mol % are 1,4-isoprene addition units. The blocks "A" and "B" represent from >5 to <40 wt. %, and >33 to <95 wt. %, respectively, relative to the overall weight of the block copolymer. The polymers have physical properties that make them valuable, e.g., as vibration damping materials.

23 Claims, 2 Drawing Sheets

Illustration of the nomogram with tangent Delta (tanDelta) and elastic modulus (G') of composition for the block copolymer composition of Ex 6.

FIG. 1. Illustration of the nomogram with tangent Delta (tanDelta) and elastic modulus (G') of composition for the block copolymer composition of Ex 6.

FIG. 2. DMA tanDelta curves for the compositions of Ex 7 (continuous line) and Comp Ex 5 (dotted line).

BLOCK COPOLYMERS AND USES THEREOF

RELATED APPLICATIONS

This application claims priority from U.S. Provisional Application No. 62/779,515, with a filing date of Dec. 14, 2018, the disclosures of which is incorporated herein by reference.

FIELD

The present disclosure relates to novel block copolymers and their uses.

BACKGROUND

Rubbery materials having good mechanical performance with high dissipation factors over a broad temperature range, combined with good processing capabilities are required in numerous areas of commerce, such as the automotive industry, construction, tool manufacture, adhesives and sealants. Some of the major applications require materials having high sound or vibration damping performance over a large range of vibration frequencies and broad temperature ranges, such as for example, from sub-ambient to supra-ambient temperatures. In addition, good mechanical performance in term of strength and sufficient modulus or hardness are also desirable. The existing thermoplastic materials may not be able to meet such requirements.

Therefore, there is a need for polymer compositions exhibiting higher damping in large temperature range with mechanical performances that can be easily processed with thermoplastic processes.

SUMMARY

One aspect of the disclosure is a styrenic block copolymer (SBC-1) having at least one polymer block A and at least one polymer blocks B, where the block "A" is a poly(vinylaromatic) block having a molecular weight of greater than 5 kg/mol; and the block "B" is a rubber block comprising polymerized units derived from a 1,3-diene and a vinylaromatic compound, and having a molecular weight greater than 15 kg/mol. In the block "B", the polymerized units derived from the vinylaromatic compound represent 5-40 wt. % of the overall weight of the block "B", and the polymerized units derived from the 1,3-diene comprise more than 80 wt. % of polymerized isoprene units, wherein 45-80 mol % of the polymerized isoprene units are 1,4-addition units. The block "A" represents from more than 5 wt. % to less than 40 wt. % of the overall block copolymer; and the block "B" represents from more than 33 wt. % to less than 95 wt. % of the overall block copolymer. The block copolymer exhibits:

(i) an aromatic blockiness index, as measured by 1-H NMR, of from more than 15% to less than 80%,
(ii) a rubber phase maximum damping factor of more than 1; and
(iii) a temperature corresponding to the rubber phase maximum damping factor of greater than −30° C. The properties (ii) and (iii) can be measured with a dynamic mechanical analyzer at 10 rad/s according to ASTM D4065 in shear mode using a plate tool.

In another aspect, a styrenic block copolymer as above, further comprising one or more blocks "D", herein designated as SBC-2, is disclosed. SBC-2 has a structure A-D-B, A-D-B-A, A-D-B-D-A, (A-D-B-)nX, (A-D-B-A-)nX, or any combination thereof. The block "D" is essentially a poly(1,3-diene) block comprising polymerized 1,3-diene units derived from an isoprenoid conjugated diene. "X" is residue of a coupling agent, and n is an integer from 1-30, and represents the number of polymer arms coupled to the terminus of the block "B" or the block "D". The coupled block copolymers (A-D-B-)nX, (A-B-D-)nX, or combinations thereof represent more than 20 wt. % of the overall weight of the block copolymer. The block A represents from more than 5 wt. % to less than 40 wt. % of the overall weight of the block copolymer, and the block B represents from more than 33 wt. % to less than 90 wt. % of the overall weight of the block copolymer. The block copolymer exhibits:

(i) a difference of greater than 10° C. between the temperature corresponding to the rubber phase maximum damping factor and the temperature corresponding to a rubber phase maximum loss modulus; and
(ii) a rubber maximum damping factor (tanDelta) of more than 1.1. Both properties can be measured with a dynamic mechanical analyzer at 10 rad/s according to ASTM D4065 in shear mode using a plate tool.

In other aspects, hydrogenated forms of the above block copolymers, SBC-1 and SBC-2 are disclosed. The hydrogenated forms have up to about 20 percent of the vinylaromatic double bonds hydrogenated, and at least 80 percent of the non-aromatic double bonds hydrogenated.

In still other aspects, blends based on each of the styrenic block copolymers, SBC-1 and SBC-2, are disclosed. The block copolymers and blends thereof are valuable materials, particularly for producing vibration damping compositions.

DESCRIPTION

The following terms used the specification and will have the following meanings:

"Isoprenoid conjugated diene" refers to the group of 1,3-dienes that includes isoprene (C5) and conjugated dienes that have two, three or higher number of isoprene units combined. Myrcene (7-Methyl-3-methylene-1,6-octadiene, $C_{10}H_{16}$) is an example of a conjugated diene having two isoprene units combined, while farnesene (3,7,11-trimethyl-1,3,6,10-dodecatetraene, $C_{15}H_{24}$) is an example of a conjugated diene having 3 isoprene units combined.

"TanDelta" is defined as the ratio between the loss modulus (G") and the elastic modulus (G'). "TanDelta", also referred to as damping factor, dissipation factor or loss factor, is commonly used as a measure of the damping in a viscoelastic system. "TanDelta maximum" is also referred to as "maximum damping factor".

"Controlled distribution" refers to a molecular structure of a diene polymer block having the following attributes: (1) terminal regions adjacent to the poly(vinylaromatic) block ("A") that are rich in (i.e., having a greater than average amount of) 1,3-diene units; (2) one or more regions not adjacent to the "A" blocks that are rich in (i.e., having a greater than average amount of) polymerized vinylaromatic units; and (3) an overall structure having relatively low blockiness. The term, "rich in" is defined as greater than the average amount, preferably greater than 5% of the average amount.

"Aromatic blockiness" as applied to a polymer refers to the percentage of aromatic units with two adjacent aromatic units in the overall amount of aromatic units present in the polymer. "Aromatic Blockiness Index" is measured using H-1 NMR spectroscopy of the copolymer and is mathematically given by the expression:

Aromatic Blockiness Index=100*(Integral2/Integral1), where Integral1 is determined by integrating the H-1 NMR spectrum from 7.5 ppm to 6.0 ppm and dividing the result by 5; and Integral2 is determined by integrating the H-1 NMR spectrum of the signal minimum region between 6.9 ppm and 6.6 ppm, to 6.0 ppm, and dividing the result by 2.

"Wet Grip index" is given by: Wet Grip indicator of sample/Wet Grip indicator of reference.

"Dry Grip index" is given by: Dry Grip indicator of sample/Dry Grip indicator of reference.

"Dry Handling index" is given by: Dry Handling indicator of sample/Dry Handling indicator of reference "Rolling Resistance index" is given by Rolling Resistance indicator of reference/Rolling Resistance indicator of sample.

"90° C. Elasticity index" is given by: 90° C. Elasticity indicator of reference/90° C. Elasticity indicator of sample.

"Tensile Strength index" is given by: Tensile strength of sample/Tensile strength of reference.

The disclosure provides styrenic block copolymers and their hydrogenated analogues that have good mechanical properties and are useful for high damping applications, including adhesives and overmolding TPE compounds. When they are used in polymer compositions for making articles, a curing step is usually not needed.

Styrenic Block Copolymer (SBC) Component:

the styrenic block copolymer SBC-1 comprises one or more polymer blocks "A" and one or more polymer blocks "B", where "A" is a poly(vinylaromatic) block having a molecular weight of greater than 5 kg/mol, and "B" is a rubber block comprising polymerized units derived from a 1,3-diene and a vinylaromatic compound and having a molecular weight of greater than 15 kg/mol. Within block "B", the polymerized units derived from the vinylaromatic compound represents 5-40 wt. % of the overall weight of the block, and the polymerized units derived from the 1,3-diene comprise more than 80 wt. % of polymerized isoprene units of which 45-80 mol % are 1,4-addition units. The 1,4-addition unit results from reaction occurring across C-1 and C-4 atoms of isoprene.

Suitable vinylaromatic compounds useful for building the block "A", also sometimes referred as "hard block", include those having 8 to 20 carbon atoms, such as for example, styrene, o-methyl styrene, p-methyl styrene, p-tert-butyl styrene, 2,4-dimethyl styrene, alpha-methyl styrene, vinylnaphthalene, vinyltoluene, vinylxylene, 1,1-diphenylethylene, or mixtures thereof. Styrene is a preferred vinylaromatic compound.

The block "A" has a molecular weight of greater than 5 kg/mol. In embodiments, the molecular weight of the block "A" can be from greater than 5 kg/mol to 10 kg/mol, from 7 kg/mol to 15 kg/mol, from 10 kg/mol to 20 kg/mol, or from 15 kg/mol to 30 kg/mol.

Suitable vinylaromatic compounds for building the block "B" can be the same as those disclosed above for building the block "A". Alternatively, they can be different from the vinylaromatic compounds used for producing block "A".

The rubber block "B" also comprises polymerized 1,3-diene units, more than 80 wt. % of which are polymerized isoprene units. The remaining (i.e., less than 20 wt. %) polymerized 1,3-diene units can be derived from one or more 1,3-dienes selected from the group consisting of 1,3-butadiene, 1,3-cyclohexadiene, 2,3-dimethyl-1,3-butadiene, 1,3-pentadiene, 1,3-hexadiene, and mixtures thereof 1,3-Butadiene is a preferred 1,3-diene for including with isoprene to form the "B" block.

The block "B" has a molecular weight of greater than 15 kg/mol. In embodiments, the molecular weight of the block "B" can be from greater than 15 kg/mol to 50 kg/mol, from 25 kg/mol to 75 kg/mol, from 50 kg/mol to 100 kg/mol, or from 100 kg/mol to 200 kg/mol.

From an overall perspective, the block "A represents from more than 5 wt. % to less than 40 wt. % of the total weight of the block copolymer, and the block "B" represents from more than 33 wt. % to less than 95 wt. % of the total weight of the block copolymer. In other embodiments, the blocks "A" and "B" represent from 10 wt. % to 35 wt. % and 35 wt. % to 80 wt. %, or from 15 wt. % to 30 wt. % and 45 wt. % to 75 wt. %, or from 25 wt. % to 35 wt. % and 50 wt. % to 60 wt. %, respectively, relative to the overall weight of the block copolymer.

In an embodiment, SBC-1 comprises one or more of structures A-B, A-B-A, (A-B-A-)nX, and (A-B-)nX, where X is a residue of a coupling agent, and "n" is an integer from 1-30. "n" represents the number of polymer arms coupled to the terminus of the block "B" in the structure (A-B-)nX, and to the terminal block "A" in the structure (A-B-A-)nX, i.e., the coupling is indicated by the open hyphen ("-"). These block copolymers have properties which are described further below In an embodiment, the styrenic block copolymer, SBC-2, comprises one or more D blocks wherein the D blocks are located between a A block and a B block. The D block essentially has polymerized units derived from an isoprenoid conjugated diene, i.e., it has additionally from zero to a maximum of 5 mol % of polymerized vinylaromatic units. Thus the block "D" can also be considered as being substantially free of polymerized vinylaromatic units.

In an embodiment, SBC-2 can have a structure A-D-B, A-D-B-A, A-D-B-D-A, (A-D-B-)nX, (A-B-D-)nX, or any combinations thereof; wherein "X" is residue of a coupling agent, and "n" is an integer from 1-30 and represents the number of polymer arms coupled to the terminus of the block "B" or the block "D". The open hyphen ("-" in the structures indicates the polymer block to which the coupling agent is bonded. The coupled block copolymers (A-D-B-)nX, (A-B-D-)nX, or combinations thereof represent more than 20 wt. % of the overall weight of the block copolymer. The block "A" represents from more than 5 wt. % to less than 40 wt. % of the overall weight of the block copolymer, and the block "B" represents from more than 33 wt. % to less than 90 wt. % of the overall weight of the block copolymer. The block copolymers have properties which are described further below.

In embodiments, the block "A" in SBC-2 has a GPC molecular weight from 6 kg/mol to 40 kg/mol, or from 7 kg/mol to 25 kg/mol, or from 8 kg/mol to 15 kg/mol.

In other embodiments, the block "D" in SBC-2 has a GPC molecular weight from 3 kg/mol to 50 kg/mol, or from 6 kg/mol to 40 kg/mol, or from 12 kg/mol to 30 kg/mol, or from 15 kg/mol to 25 kg/mol.

In still other embodiments, the block "D" can have more than 50 mol %, or more than 80 mol %, or from greater than 50 mol % up to 70 mol %, or from greater than 60 mol % up to 90 mol, or from 70 mol % to 85 mol % of the polymerized 1,3-diene units as 1,4-addition units.

In an embodiment, the SBC-2 has a composition wherein the block copolymers A-D-B-A, A-D-B-D-A, (A-D-B-)nX, (A-B-D-)nX, or any combinations thereof, represent from 70 wt. % to 100 wt. % of the overall weight of the block copolymer; the block copolymer exhibits a tensile strength of greater than or equal to 15 MPa, measured according to ASTM D412.

The block copolymers SBC-1 and SBC-2 can also further comprise a functional group. In an embodiment, the functionalized SBC-1 has a functional group selected from the group consisting of OH, halogeno, SO3Y, wherein Y is a metal cation, H, alkoxy, or aryloxy; acid anhydride, amino, epoxy, and CO2Z, wherein Z is a metal cation, H, alkoxy, or aryloxy.

In another embodiment, the block copolymer can have a structure, designated SBC-3, where the blocks "A" and "B" comprise polymerized units derived from one or more vinylaromatic compounds having a formula (I):

wherein R1 is H or CH$_3$, and R2 is H, an alkyl group or an aryl group. Non-limiting examples of a suitable alkyl group include C1-C8 linear or branched alkyl groups, such as methyl, ethyl, n-butyl, isobutyl, and tert-butyl. Examples of aryl group include phenyl, tolyl, and xylyl. In a preferred embodiment, R1 is H and R2 is H or CH$_3$.

The SBCs described above can also be selectively hydrogenated to provide the corresponding hydrogenated block copolymers. Thus in one embodiment, the selectively hydrogenated form of SBC-1, SBC-2 or SBC-3 can have more than 80 mol % of the double bonds in the polymerized 1,3-diene units in the blocks "B" and less than 30 mol % of the aromatic ring double bonds in the block "A" hydrogenated. In another embodiment, the hydrogenated block copolymers can have up to 20 percent of the aromatic double bonds in the blocks "A" hydrogenated, and at least 80 mol % of the polymerized 1,3-diene units in the blocks "B" hydrogenated.

The selectively hydrogenated forms of the block copolymers SBC-1, SBC-2 and SBC-3 can also be further functionalized.

In an embodiment, the selectively hydrogenated form of SBC-2 has more than 80 mol % of the double bonds in the polymerized 1,3-diene units in the blocks "B" and "D" hydrogenated, and less than 30 mol % of the aromatic ring double bonds in the blocks "A" hydrogenated. In another embodiment, SBC-2 can have more than 92 mol % of the double bonds in the polymerized 1,3-diene units in blocks "B" and "D" hydrogenated, and less than 30 mol % of the aromatic ring double bonds in block "A" hydrogenated. In yet another embodiment, at least 80 mol % of the double bonds in the polymerized 1,3-diene units in blocks "B" and "D" are hydrogenated, and up to 20 percent of the aromatic double bonds in the blocks "A" are hydrogenated. In still other embodiments, SBC-2 independently has from 80 mol % to 98 mol %, or from 85 mol % to 92 mol %, or from 88 mol % to 95 mol % of the polymer chain double bonds in the blocks "B" and "D" hydrogenated, and independently up to 20 mol %, or from greater than 20 mol % to less than 30 mol % of the aromatic ring double bonds in the blocks "A" hydrogenated.

The 1,3-dienes useful for constructing the block "D" include at least 95 mol % of one or more members belonging to the group of isoprenoid conjugated dienes. Examples of suitable isoprenenoid conjugated dienes include isoprene, myrcene, farnesene, or mixtures thereof. Small amounts of up to a maximum of 5 mol % of a non-isoprenoid diene, such as 1,3-butadiene can also be included in the blocks "D". In embodiments, the 1,3-diene mixture for building the blocks "D" is selected from isoprene, or a mixture having at least 95 mol % of isoprene and up to 5 mol % of 1,3-butadiene.

Preparation of the SBCs:

The block copolymers are prepared by anionic polymerization using techniques known in the art. The polymerization initiator is generally an organometallic compound, such as organolithium compounds, example, ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. The amount of initiator needed is calculated based on the molecular weight to be achieved, generally from 0.002 to 5 mol percent, based on the amount of monomer to be polymerized. Suitable solvents include aliphatic, cycloaliphatic or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene or ethylbenzene, or suitable mixtures. Polymer chain termination is carried out using a coupling agent, such as bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkylsilicon methoxides, alkyl silicon ethoxides, polyfunctional aldehydes, such as terephthalic dialdehyde, ketones, esters, anhydrides or epoxides. For hydrogenated block copolymers, it is preferable to use 1,2-dibromoethane or diepoxides, in particular diglycidyl ethers, such as 1,4-butanediol diglycidyl ether.

If desired, a Lewis base additive, which affects polymerization parameters can also be employed. Examples of Lewis bases include dimethyl ether, diethyl ether, ethylene glycol dimethyl ether, 1,2-diethoxypropane, diethylene glycol dimethyl ether, tetrahydrofuran, tetrahydrofurfuryl ethers, such as tetrahydrofurfuryl methyl ether, and tertiary amines.

Hydrogenation of the vinyl groups present in the BC can be carried out under conditions such that at least 80 mol %, at least 92 mol %, or at least 95 mol % of the vinyl groups are reduced, and 0-20 mol % of the arene double bonds are reduced. A suitable catalyst based on nickel, cobalt or titanium is used in the hydrogenation step.

Properties of the SBCs:

The SBCs described above have physical properties that makes them valuable for high performance applications. They can be injection molded or extruded using conventional plastics processing equipment, with or without a curing agent. The SBCs have a unique adhesion and damping performance at ambient or outdoor temperatures, while also maintaining good mechanical properties. They also have elastic properties that make them good substrates for damping materials, especially for applications requiring high damping of a large range of frequencies over a broad range of temperature. They also exhibit high tensile strength while possessing medium to high hardness. The SBCs also have good adhesion properties.

Figure 1:
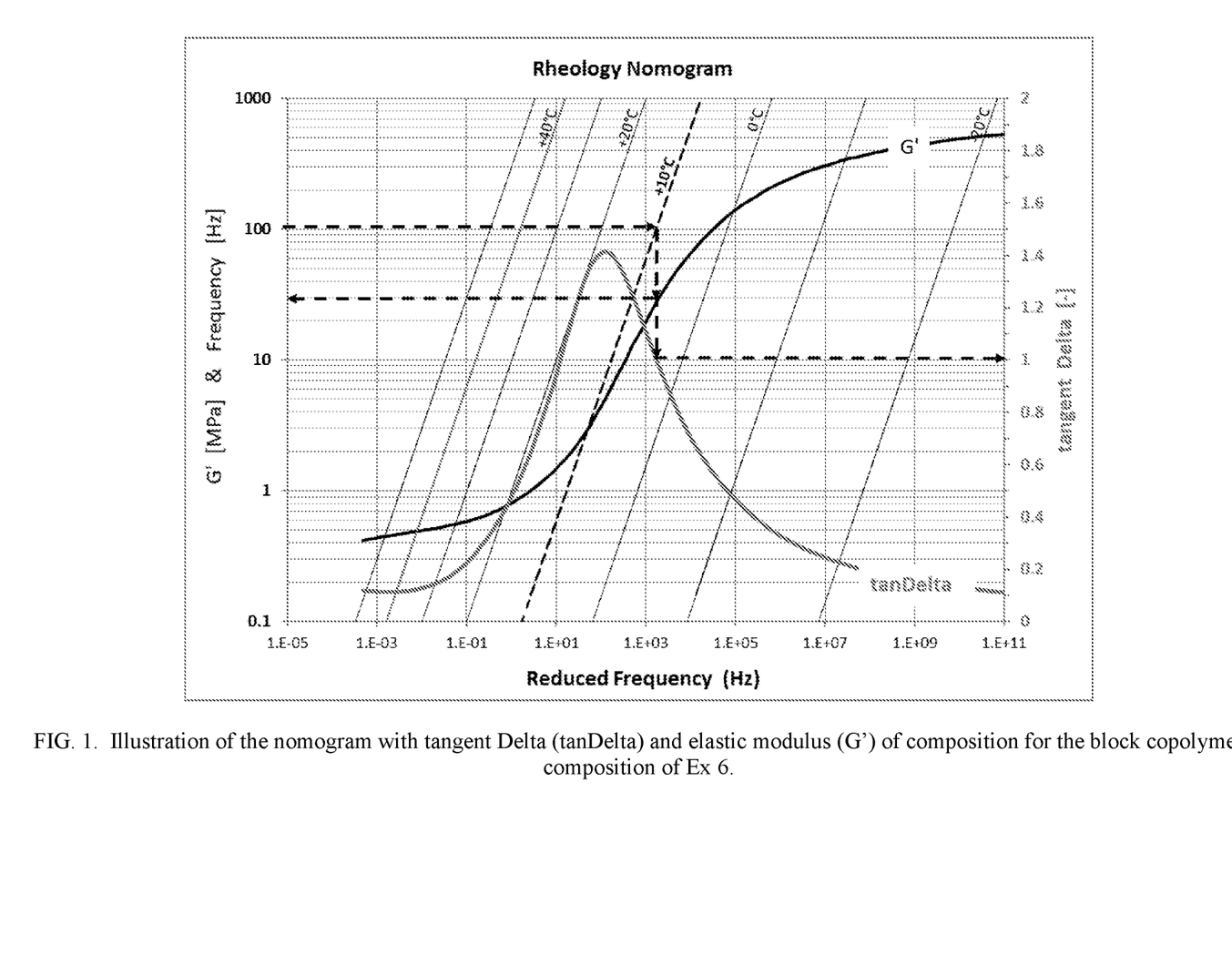
FIG. 1 is an illustration of the nomogram with tangent Delta (tanDelta) and elastic modulus (G') of composition for the block copolymer composition of Ex 6.

The SBCs and the TPEs formulated therefrom can be evaluated for their mechanical and viscoelastic properties using a DMA (Dynamic Mechanical Analyzer), particular the tangent delta (tanDelta, tan δ), elastic modulus and loss modulus as a function of temperature at a given angular frequency. Viscoelastic properties of rubbery materials are strongly a function of the temperature and the frequency (or cycle time) applied for the measurement. The Time-Temperature Superposition Principle (TTSP) can be used to build rheological master curves that are useful to predict the rheological behavior at extrapolated frequencies (Ferry, J. D., 1980, Viscoelastic Properties of Polymers, 3rd ed., New York: Wiley. Time Temperature Superposition: A Users Guide, J. Dealy, D. Plazek, Rheology Bulletin, 78(2), July 2009, p 16-30. "Thermal Analysis Application Brief; Application of Time Temperature Superposition principles to DMA; Number TA-144). One application of TTSP is in the construction of a nomogram for a given material by building a quantitative model using the WLF (Williams-Landel-Ferry) equation. Such a nomogram is illustrated in FIG. 1, which exemplifies a nomogram for the block copolymer composition of example Ex 6 (See Table 6). FIG. 1 can be used in the following way to find the viscoelastic behavior of the composition of Ex 6, which exhibits a tanDelta of 1.0 at +10° C. under a vibration of 100 Hz, measured using DMA according to ASTM D4065 in shear mode using a plate/plate tool. Starting at the 100 Hz frequency mark on the right hand side axis, move left horizontally till the 10° C. oblique temperature line is reached, which corresponds to a reduced frequency of approximately 2000 Hz. From there, move vertically till the tanDelta or the elastic modulus curve is intersected. The value of the elastic modulus (G'), 30 MPa in this case, can be read off of the left hand axis.

By varying the architecture of the SBC-1 and SBC-2 block copolymers, a wide range of physical properties can be achieved. In an embodiment, the SBC-1, wherein the block copolymers A-B-A, (A-B-A)nX, and (A-B)nX, or any combinations thereof, represent from 75 wt. % to 95 wt. % of the overall weight of the block copolymer, exhibits a tensile strength of greater than or equal to 15 MPa, measured according to ASTM D412.

In another embodiment, the SBC-2, having a block B having 65% to 85% of polymerized isoprene based units, wherein 50-75 mol % of the polymerized isoprene based are 1,4-addition units; exhibits a temperature corresponding to the rubber block maximum damping factor of from above 0° C. to below +20° C.

In an embodiment, SBC-1 has a rubber phase maximum damping factor of more than 1; a temperature corresponding to the rubber phase maximum damping factor of greater than −30° C.; and a difference of greater than 10° C. between the temperature corresponding to the rubber phase maximum damping factor and the temperature corresponding to a rubber phase maximum loss modulus; all can be measured with a dynamic mechanical analyzer at 10 rad/s according to ASTM D4065 in shear mode using a plate tool.

In an embodiment, SBC-2 exhibits a rubber phase maximum damping factor (tanDelta) of more than 1.1, measured with a dynamic mechanical analyzer at 10 rad/s according to ASTM D4065 in shear mode using a plate tool. In another embodiment, the SBC further comprising one or more polymer blocks "D" exhibits: (i) a rubber block maximum damping factor of more than 1.2, (ii) a temperature corresponding to the rubber block maximum damping factor of from above −10° C. to below +30° C., (iii) a difference of greater than 15° C. between the temperature corresponding to the rubber block maximum damping factor and the temperature corresponding to a rubber block maximum loss modulus, and (iv) a maximum absolute change in elastic modulus (G') of less than 40 MPa per ° C.; all can be measured with a dynamic mechanical analyzer at 10 rad/s according to ASTM D4065 in shear mode using a plate tool.

Polymer Compositions Based on the SBCs:

The SBCs and the hydrogenated forms thereof are useful for producing a variety of polymer blends, including thermoplastic elastomer (TPE) compositions. In an embodiment, the TPE composition is a blend of SBC-1, SBC-2 or SBC-3 with one or more of components (a), (b), (c), (d), and (e), where (a) is at least one plasticizer, (b) is at least one tackifying resin, (c) at is least one plastic material, (d) at least one filler, and (e) is at least one additive. In embodiments, the plasticizer component (a) and/or the tackifying resin component (b) are those that are miscible with the rubber phase of at least one of SBC-1, SBC-2, and SBC-3.

In an embodiment, the TPE composition comprises 99 wt. %-1 wt. % of the SBC copolymer and 1 wt. %-99 wt. % of one or more components selected from (a), (b), (c), (d), and (e). In other embodiments, the TPE composition can comprise 50 parts by weight in total of (a) and (b) per 100 parts by weight of the SBC-1, SBC-2, or SBC-3; or 50 parts by weight of (c) per 100 parts by weight of the SBC-1, SBC-2, or SBC-3.

The plasticizer can be for example, a paraffinic oil, naphthenic oil, a natural oil, a hydrotreated naphthenic oil, a low molecular weight polyolefin, a low molecular weight liquid rubber, or combinations thereof.

The tackifying resin can be one or more natural or modified rosins or rosin esters including those made using polyols, polyterpene resins, phenolic-modified terpene resins, aromatic resins, aliphatic petroleum resins such as those made using C5 or C9 hydrocarbon streams obtained from petroleum cracking/refining, hydrogenated forms thereof, or any combination of the foregoing resins.

The plastic component (c) can be a polystyrene, a polyolefin such as polypropylene or polyethylene, or blends thereof a thermoplastic elastomer such as a thermoplastic polyurethane; an aromatic polyether, or combinations thereof. Suitable polypropylenes also include a crystalline thermoplastic polymer containing more than 50 wt. %, as a function of the total weight of the polymer, of polymerized propylene units. Suitable polyethylene also include a crystalline thermoplastic polymer containing more than 50 wt. %, as a function of the total weight of the polymer, of polymerized ethylene units. Other suitable plastics include polyamides, copolyesters, thermoplastic polyurethanes, polyphenylene ethers, copolymers of styrene with comonomers such as acrylonitrile and methacrylates, or mixtures of the foregoing plastics.

Suitable fillers include one or more inorganic silicates such as andalusite, sillimanite, kyanite, mullite, pyrophyllite, or allophane, and mineral calcium silicate, silica, quartz powder, metal sulfates such as barium sulfate, metal oxides such as zinc oxide, titanium dioxide, zeolites, leucite, potash feldspar, biotite, gypsum, anhydrite or heavy spar, and calcium minerals such as talc or chalk (CaCO3), metal hydroxides. In an embodiment, the filler for use with SBC-1 and/or SBC-2, and/or functionalized forms thereof, and/or hydrogenated forms thereof, is selected from calcium carbonate, talc, mica, magnesium hydroxide, aluminum hydroxide, barium sulfate, and combinations thereof.

In an embodiment, a blend comprises: 100 parts by weight of SBC-1, and 1-500 parts by weight in total of components (i), (ii), and/or (iii), where component (i) is a paraffinic oil, a naphthenic oil, a natural oil, a tackifying resin, or combinations thereof component (ii) is a thermoplastic polymer, and component (iii) is a filler. In another embodiment, the blend has a composition wherein component (ii) is selected from the group consisting of a polyolefin, a thermoplastic elastomer, an aromatic polyether or combinations thereof. In yet another embodiment, the blend comprising components (i), (ii) and/or (iii) as above, further comprises one or more of an antioxidant, a dye, a colorant, a flame retardant, a foaming agent, a UV stabilizer, a wax, a surface agent, a rheology modifier, and an aromatic resin.

The SBC-1 and/or SBC-2 can also be blended with one or more rubbers, which can be natural rubber and/or a synthetic rubber. Non-limiting examples include natural rubber (NR), ethylene-propylene-diene rubber (EPDM), ethylene/alpha-olefin rubbers (EPR), ethylene-vinyl acetate (EVA), styrene/butadiene rubber (SBR), acrylonitrile/butadiene rubber (NBR), polychloroprene rubbers, polybutadiene rubbers (BR), synthetic polyisoprene rubber (IR), and isobutylene-isoprene rubber (IIR).

In an aspect, a composition comprising 1 wt. % to 99 wt. % of SBC-1 and 99 wt. % to 1 wt. % of a rubber can be produced. When such a composition further includes a curing agent package, the cured composition resulting from the curing step can be used for producing various articles. The curing package usually consists of sulfur, an accelerator, and can also include an activator. Examples of the accelerator include N-cyclohexyl-2-benzothiazole sulfenamide; N-tert-butyl-2-benzothiazole sulfenamide; 2-(morpholinothio)benzothiazole; 2-mercaptobenzothiazole; tetraethylthiuram disulfide; tetramethylthiuram monosulfido; tetramethylthiuram disulfide; dimethyldithiozinc carbamate; diphenyl guanidine sulfide; insoluble sulfur; 4,4'-dithiomorpholine; dipentamethylene thiuram tetrasulfide; dicumyl peroxide; 2,2'-bis(tert-butylperoxy)diisopropylbenzene; quinone dioxime, etc. Combinations of two or more curing agents can also be used. Examples of the activator include zinc oxide, stearic acid, and the like. Other optional ingredients such as a lubricant can also be included in the curing package.

The additive component (e) can be a lubricant, or one or more of other additives, such as a heat stabilizer, a photostabilizer, an ultraviolet absorber, an antioxidant, a colorant, a dye, a foaming agent, a surface agent, a rheology modifier, an antistatic agent, a flame retardant, a water repellent, a water-proofing agent, a hydrophilicity-imparting agent, an electrical conductivity-imparting agent, a thermal conductivity-imparting agent, an electromagnetic wave shielding property-imparting agent, a translucency adjuster, a fluorescent agent, a sliding property-imparting agent, a transparency-imparting agent, an anti-blocking agent, a metal deactivator, and an antibacterial agent, so long as they will not adversely affect the properties that make them useful for the intended use.

In an embodiment, a blend comprises: 100 parts by weight of SBC-1, and 1-500 parts by weight in total of components (i) and (ii) and/or (iii), where component (i) is a paraffinic oil, a naphthenic oil, a natural oil, a tackifying resin, or combinations thereof component (ii) is a thermoplastic polymer, and component (iii) is a filler. In another embodiment, the blend has a composition wherein component (ii) is selected from the group consisting of a polyolefin, a thermoplastic elastomer, an aromatic polyether or combinations thereof.

In an embodiment, the TPE blends of SBC-1 and/or SBC-2, described above, do not comprise a crosslinking agent, or alternately, substantially free of, or contain less than 0.01 wt. % of the crosslinking agent.

The block copolymer SBC-3 or its hydrogenated form are also valuable for producing blend compositions. In an embodiment, the composition comprises: (i) 1-99 part by weight of SBC-3 or the hydrogenated form, per 100 parts of the overall composition; (ii) 99-1 parts by weight of at least one rubber, per 100 parts of the overall composition; and (iii) up to 1000 parts by weight, per 100 parts by weight of the sum of (i) and (ii), of one or more of a filler, a plasticizer, a resin, and an additive.

The blend compositions based on SBC-3 or its hydrogenated form can further comprise a curing agent package. Any type of curing agent known in the art can be used. Examples include sulfur, organic compounds having —SH groups or protected forms thereof, and organic peroxides. In an embodiment, a curable composition comprises: (i) 100 parts by weight of an elastomeric composition, (ii) 50 to 200 parts by weight of a filler, (iii) 0.1 to 20 parts by weight of a curative, and (iv) up to 70 parts by weight of a plasticizer or a resin, where the amount of each component (i)-(iv) is with respect to 100 parts by weight of the overall curable composition. The elastomeric composition (i) comprises, based on 100 parts of the composition, (a) 5-50 parts by weight of the block copolymer SBC-3 or a hydrogenated form thereof, and (b) 5-95 parts by weight of a rubber.

Preparation of Compositions Based on the SBCs:

The TPE compositions can be produced by mixing the SBC-1 and/or SBC-2 with the desired ingredients as described above using a suitable device such as a Henschel mixer, a V blender, a ribbon blender, etc. Alternatively, the compositions can be obtained by using a single screw or twin screw extruder, a kneader, or the like. The resultant resin composition can be pelletized.

Uses of the Compositions Produced from the SBCs:

The various physical properties described above makes the SBC-1, SBC-2 and SBC-3 block copolymers, hydrogenated forms thereof, as well as the various TPE compositions and blend compositions obtained therefrom, valuable for making various articles. In an embodiment, the compositions are valuable for making adhesive compositions for use in applications requiring high shear resistance.

Another use of the SBCs is for making a vibration or sound damping composition, or more generally, for energy absorption, both for outdoor and indoor applications, particularly for broad service temperature ranges, e.g., −50° C. to +100° C., or −30° C. to +80° C., or −10° C. to 50° C., or 0° C. to 100° C. In an embodiment, a vibration damping composition comprises 100 parts by weight of a hydrogenated form of SBC-1, 5-80 parts by weight of a propylene-based polymer, and less than 40 parts by weight of a paraffinic oil, a naphthenic oil, a natural oil, or a tackifying resin exhibits: (i) a temperature corresponding to the rubber block maximum damping factor of from −5° C. to +20° C., a rubber block maximum damping factor of more than 0.8, and a difference of greater than 10° C. between the temperature corresponding to the rubber block maximum damping factor and the temperature corresponding to a rubber block maximum loss modulus; all can be measured with a dynamic mechanical analyzer at 10 rad/s according to ASTM D4065 in shear mode using a plate tool. In an embodiment, the propylene-based polymer is a crystalline thermoplastic polymer containing more than 50 wt. %, as a function of the total weight of the polymer, of polymerized propylene units.

The block copolymers and compositions derived from SBC-1, SBC-2 or their hydrogenated thereof can be processed by a variety of techniques, such as by foaming (for producing foamed articles), coating, injection molding, extrusion, coextrusion, blowing, hot melt spraying, laminating with other materials, compression molding, and solution spraying. The articles thus produced have wide applications, such as vibration damping, adhesives, labels, sealants, seals, films, coatings, e.g., wall coating or metal coatings, toys, shoe parts, wire and cables, medical goods, packaging and sports goods.

EXAMPLES: THE FOLLOWING TEST METHODS CAN BE USED

Polymer molecular weights can be determined by gel permeation chromatography (GPC) using polystyrene calibration standards according to ASTM 5296-11. Polymer samples were dissolved in THF and run on the appropriate column set using both RI (refractive index) and UV detectors. The obtained peak polystyrene equivalent molecular weight values are reported here as GPC molecular weight (MW), or simply Mp in units of kgPS/mol (kg polystyrene per mole) as unit. Coupling Efficiency (CE) (relative to the coupling agent used in the preparation of the SBC) was determined by GPC from the peak integration. CE is the ratio (expressed in %) of the sum of the integrated peak areas for the coupled species (with n>1) to the sum of the integrated peak areas of the coupled and uncoupled species (n>0). Proton NMR methodology was used to determine the total aromatic content (PSC), and the 1,4 units content in the non hydrogenated block copolymer. Glass transition temperature (Tg) of all polymer samples were measured by Dynamic Mechanical Analysis (DMA) according to ASTM4065. Temperature sweep experiments were conducted from −80° C. to 200° C. with a heating ramp of +2° C./min and at 10 rad/s, where storage moduli (G'), loss moduli (G") and loss factors (tan δ) were obtained as a function of temperature. The rubber tanDelta peak temperature is here considered to be the rubber Tg.

Damping performance for various temperatures and frequencies was generated through the reading of tanDelta values in the nomogram as explained previously. nomograms were generated as described above using temperature sweep data generated at various angular frequencies: 0.1 rad/s, 0.3 rad/s, 1 rad/s, 3 rad/s, 10 rad/s, 30 rad/s, 100 rad/s using a DMA (dynamic mechanical analyzer). The maximum damping factor for the rubber block of the block copolymers SBC-1 and SBC-2 were collected from the curve obtained with a 10 rad/S T sweep.

The damping performance as a function of the breadth of the temperature range was characterized via several methods, all of which use the DMA. In the first method, the temperature difference in (degree Celsius) between the temperature at which tanDelta attains a peak value (also called "peak tanDelta temperature) and the temperature at which the loss modulus G" attains a peak value (also called "loss modulus G" peak temperature) at a sweep frequency of 10 rad/s is determined. A larger temperature difference signifies a broader tanDelta peak and a damping performance that is closer to the damping factor measured at the peak tanDelta value. In the second method, the tanDelta value is recorded at a temperature 20° C. lower than the peak tanDelta temperature. In the third method, the elastic modulus is measured accurately from which the maximum rate of change of the elastic modulus (G') as a function of temperature, expressed in MPa per ° C., is calculated. The lower the rate of change, the broader is the glassy to rubbery transition and the temperature range over which damping occurs.

Sample specimens for conducting the measurements are prepared using two different methods. In the first method, the SBC or the TPE composition produced therefrom are pressed under high pressure at 180° C. into 2 mm plates. In the second method, the polymer and other required ingredients are dissolved in toluene at room temperature to obtain a 10 wt. % solution, which is poured onto a siliconized tray and allowed to evaporate at a slow rate. The resulting cast film is dried in a vacuum oven at 40° C. to remove the residual toluene.

Tensile stress-strain properties can be measured according to ASTM D412 using dumbell 'C' and a crosshead displacement speed of 500 mm/min. Hardness shore A with 3 second dwell time is measured on a 3×2 mm plate according to ASTM D2240. Unless otherwise specified, all reported melt flow rates (MFR) can be measured according to D1238 under 2.16 kg load and at 230° C.

Preparation of exemplary polymer (Ex 1): In a first reactor was added sequentially cyclohexane (0.2 L), 9.19 g of 1,1-diphenylethylene, 104 mg of diethyl ether and 12 mL of 0.14 M sec-butyllithium. After being heated to 50° C., 31.4 g of styrene was added over 28 min. After 3 h, 183 g of the reaction mixture was added to a second reactor containing 1.1 L of dried cyclohexane, 0.3 mL of 1,2-diethoxypropane, 116.3 g isoprene and 0.5 mL of sec-butyllithium, pre-heated to 60° C. After 104 min, 2.7 g isoprene was added followed by 0.7 mL of divinylbenzene (coupling agent). After 123 min, methanol (0.1 mL) was added. The resulting non-reactive, coupled polymer was precipitated by pouring the solution into water. The non-coupled polymer arm had a GPC Mp of 158 Kg/mol and the major polymer species had a GPC Mp of 787 Kg/mol. The structural characteristics measured are shown in Tables 1 and 2.

Preparation of exemplary polymer (Ex 2): Ex 2 is an example of the SBC-3 category of styrenic block copolymers.

Cyclohexane (6 L) was heated in a 10 L stainless steel reactor to 50° C. using a heating mantle. To this was added 30 mL of 0.49 M sec-BuLi [0.49 M], followed by addition of styrene (137 g) over 5 min. After 41 min at 50° C., an aliquot indicated formation of the first (styrene) polymer block. After a further 24 min, isoprene (144 g) was added over 6 minutes. After being maintained at 50° C. for 46 min, an aliquot of the reaction reaction mixture indicated formation of the second (isoprene) polymer block. Then 1,2-diethoxypropane (3 mL) was added and 6 minutes later, an isoprene dosing program was initiated followed 1 min later with a styrene dosing program. The styrene (258 g) was dosed over 20 minutes, and the isoprene (450 g) was dosed over 32 minutes. After 121 min from the start of dosing isoprene, another dose of isoprene (10.6 g) was added to the reaction mixture. After 26 min, 0.7 g of MTMS (coupling agent) was added followed 10 min later by a second aliquot of MTMS (0.02 g). Approximately 2 h later, 0.4 mL of 2-ethylhexanol was added to the reaction mixture. An aliquot of the reaction mixture was withdrawn and stabilized with a stabilizing agent. The polymer product was isolated by steam coagulation followed drying.

Preparation of exemplary polymer (Ex 3): Ex 2 is an example of the SBC-3 category of styrenic block copolymers.

After taking an aliquot of the reaction mixture from the first reactor for preparing the polymer Ex 1, the remaining material (4.0 kg) was transferred to another reactor equipped with a hollow shaft stirrer under inert atmosphere and diluted with 0.5 L of cyclohexane. The mixture was heated to 50° C. and hydrogen gas was introduced into the reactor to a pressure of 20 bar. The hydrogenation catalyst (Ni/Al 1:2.2 mole/mole) was then added so as to achieve a Ni concentration of 9 ppm in the reaction mixture. Then the pressure was increased to 40 bar and the temperature to 70-75° C. The progress of the reaction was monitored by NMR and additional catalyst aliquots were added in increasing amounts from 15 ppm to 50 ppm until the conversion of the polymerized 1,3-diene units was >92 mol % (analysis of the final sample showed a final hydrogenation level of 94.5 mol %. The catalyst was removed from the reaction mixture, and the polymer solution after being treated with a stabilizer, was steam coagulated, followed by drying to furnish the polymer product.

Preparation of exemplary polymer (Ex 4) (with a different hydrogenation level): To cyclohexane (6 L), heated to 50° C. in a 10 L stainless steel reactor, 28 mL of 0.49 M sec-BuLi [0.49 M], followed by addition of styrene (137 g) over 5 min. After 40 min at 50° C., an aliquot indicated formation of the first (styrene) polymer block. After a further 27 min, isoprene (143 g) was added over 5 minutes. After being maintained at 50° C. for 53 min, an aliquot of the reaction reaction mixture indicated formation of the second (isoprene) polymer block. Then 1,2-diethoxypropane (3 mL) was added and 6 minutes later, an isoprene dosing program was initiated followed 1 min later with a styrene dosing program. The styrene (258 g) was dosed over 16 minutes, and the isoprene (483 g) was dosed over 24 minutes. After 101 min from the start of dosing isoprene, another dose of isoprene (10 g) was added to the reaction mixture. After 16 min, 0.63 g of MTMS (coupling agent) was added followed 10 min later by a second aliquot of MTMS (0.02 g). After 130 min, 0.4 mL of 2-ethylhexanol was added to the reaction mixture. After cooling down the reaction mixture, 234 g of the reaction mixture was transferred to An aliquot of the reaction mixture was withdrawn and stabilized with a stabilizing agent. The polymer product was isolated by steam coagulation followed drying. After cooling down the reaction mixture, 234 g of the total mixture was transferred to another reactor equipped with a hollow shaft stirrer under inert atmosphere. The mixture was heated to 50° C. and hydrogen pressure (20 bar) was applied. Hydrogenation catalyst (Co/Al 1:1.6 mole/mole) was then added to achieve a concentration of 5 ppm Co in the reaction mixture. Then the pressure was increased to 40 bar and the temperature to 70° C. The progress of the reaction was monitored by NMR and additional catalyst aliquots in increasing amounts from 15 ppm to 50 ppm were added until the conversion of the polymerized diene units was 96 mol %. The catalyst was next removed and the solution was stabilized with a stabilizer, steam coagulated and dried to furnish the polymer product.

Comp Ex 1 is a comparative polymer close to the example polymer Ex 1 except that it does not contain a block B, and contains an isoprene rubber base that does not contain >5 wt. % of copolymerized vinylaromatic units.

Comp Ex 2 is a commercially available hydrogenated styrenic block copolymer having a controlled distribution rubber block composed of copolymerized styrene and 1,3-butadiene units. The copolymer does not contain a block B and is also devoid of polymerized isoprene units.

Comp Ex 3 is a non-hydrogenated styrene-isoprene-styrene block copolymer where the isoprene polymer block does not any copolymerized aromatic units, and has a >90 wt. % of polymerized 1,4-isoprene units.

Comp Ex 4 is a commercially available hydrogenated styrenic block copolymer having, prior to hydrogenation, a rubber block having a high level (more than 60 mole %) of polymerized 1,2-isoprene units and 3,4-isoprene addition units, and no more than 5 wt. % of copolymerized vinylaromatic units.

Comp Ex 5 is a composition obtained by combining the block copolymer of Comp Ex 4 and a commercially available polypropylene having a MFR of 13 in a relative weight ratio of 70/30, respectively.

The composition of Ex 5 is obtained by combining 100 parts of the block copolymer of Ex 3 with 30 parts of a commercially available cycloaliphatic resin having a softening point of 103° C.

The composition of Ex 6 is obtained by combining 100 parts of the block copolymer of Ex 3 with 10 parts of a commercially available white paraffinic oil.

The composition of Ex 7 is obtained by combining the block copolymer of Ex 3 and a commercially available polypropylene having a MFR of 13 in a relative weight ratio of 70/30, respectively.

The compositions of Ex 8 and Comp Ex 6 are shown in Table 8.

Preparation of Adhesive Formulations: Two adhesive formulations were produced as toluene solutions from the block copolymers of Ex 8 and Comp Ex 6 by mixing with the following commercially available materials: (A) an aliphatic C5 resin tackifier having a narrow molecular weight distribution; (B) a naphthenic process oil plasticizer; and (C) an antioxidant. The weight ratio the polymer component to the other ingredients (A) to (C) was kept constant, but the weight ratio of the plasticizer to the tackifier was adapted so as to achieve similar rubber phase Tg and achieve comparable adhesion at room temperature. The resulting solutions were coated on PET backing to a coating weight of 25 g adhesive per square meter at room temperature.

180° Peel Adhesion (180° PA) was measured on stainless steel according to FTM1. Holding Power (HP) to stainless steel surface was measured according to FTM8 at various temperatures and applied load weights.

In the Tables below, the following terms/abbreviations are used: CE is coupling efficiency. S is Styrene. DPE is 1,1-diphenylethylene. Iv is a polymerized isoprene block having less than 90% wt. % of polymerized 1,4-isoprene units in the block Iv. I is a polymerized isoprene block having more than 90 wt. % of polymerized 1,4-isoprene units in the block I. Bv is a polymerized butadiene block having less than 90 wt. % of polymerized 1,4-butadiene units in the block Bv. "Ar" means vinylaromatic. "n" is the weight average value for the block copolymer.

TABLE 1

Bock copolymers description.

| Example ID | SBC general structure/ SBC formula | Wt. % A block content | Wt. % B block content | Wt. % vinylaromatic unit content | Wt. % hydrogenation | Aromatic Blockiness Index |
|---|---|---|---|---|---|---|
| Ex 1 | (A-B-)nX/(S/DPE-Iv/S)nX | 19 | 81.5 | 33 | 0 | 86 |
| Ex 2 | (A-D-B-)nX/(S-I-Iv/S)nX | 14 | 72 | 43 | 0 | 36 |
| Ex 3 | Hydrogenated (A-D-B-)nX/ Hydrogenated (S-I-Iv/S)nX | 14 | 72 | 36 | 95 | 38 |
| Ex 4 | Hydrogenated (A-D-B-)nX/ Hydrogenated (S-I-Iv/S)nX | 13 | 73 | 38 | 97 | 40 |
| Comp Ex 1 | (S/DPE-Iv)nX | 17 | NA | 17 | 0 | 89 |
| Comp Ex 2 | Hydrogenated (S-Bv/S*)nX | 21 | NA | 42 | 99 | 56 |
| Comp Ex 3 | (S-I)nX | 22 | NA | 22 | 0 | 98 |
| Comp Ex 4 | Hydrogenated (S-Iv-S) | 20 | NA | 20 | 88 | 99 |

*Denotes that the Bv block has a controlled distribution of polymerized styrene units.
NA means "not applicable".

Ex 3 and Ex 4 polymers exhibit a high level (95 and 97%, respectively) of hydrogenation in the polymerized diene units. This high level of hydrogenation leads to good resistance to outdoor conditions and especially to thermal oxidation and UV weathering resistance.

TABLE 2

Bock copolymers description.

| Example ID | A block Mp | B block Mp | B block Wt. % Aromatic | B block Wt. % isoprene units | B block Wt. % 1,4-isoprene units | D block Mp | D block Wt. % 1,4-diene units | CE of SBC (Wt. %) | "n" of SBC | Coupling Agent |
|---|---|---|---|---|---|---|---|---|---|---|
| Ex 1 | 20.6 | 135 | 12.8 | 100 | 74 | NA | NA | 90 | 4.8 | DVB |
| Ex 2 | 9.3 | 59.1 | 36 | 100 | 54 | 15.4 | 93 | 80 | 2.3 | MTMS |
| Ex 3 | 9.3 | 59.1 | 36 | 100 | 54 | 15.4 | 93 | 76 | 2.3 | MTMS |
| Ex 4 | 10.0 | 59.1 | 36 | 100 | 54 | 14.7 | 93 | 73 | 2.3 | MTMS |
| Comp Ex 1 | 21.3 | NA | NA | NA | NA | 88 | 52.4 | 91 | 3.6 | DVB |

NA: not available.

TABLE 3

DMA properties of the block copolymers.

| Example ID | Peak tanDelta | tanDelta peak temp ($T_g$) (° C.) | $\Delta T$ ($T_g - T_{G''max}$) (° C.) | tanDelta at ($T_g - 20$) | Max d(tanDelta)/dT (per ° C.) | dG'/dT (MPa/° C.) |
|---|---|---|---|---|---|---|
| Ex 1 | 1.72 | −21.3 | 11.0 | 0.08 | 0.158 | NA |
| Ex 2 | 1.22 | 15.7 | 21.7 | 0.33 | 0.062 | −32 |
| Ex 3 | 1.32 | 14.7 | 18.9 | 0.27 | 0.083 | −23 |
| Comp Ex 1 | 2.41 | −18.3 | 8.0 | 0.05 | 0.339 | NA |
| Comp Ex 2 | 0.77 | −25.3 | 15.0 | 0.14 | 0.041 | −31 |
| Comp Ex 3 | 2.06 | −51 | 6.0 | 0.03 | 0.345 | −96 |
| Comp Ex 4 | 1.71 | −4.3 | 8.0 | 0.05 | 0.193 | −72 |

NA: not available.

Comp Ex 2 has a low tanDelta peak value of 0.77. This is not sufficient to reach a high performing damping performances. Comp Ex 1, Comp Ex 3 and Comp Ex 4 are all missing a broad tanDelta peak leading to a inferior operating window with good damping performance. This is visible through the four following DMA characterizations: a difference in temperature T('Tg')−T(G''$_{max}$) below 10° C.; a tanDelta value at 20° C. below the peak value below or equal to 0.06; a sharp increase in tanDelta value in function of temperature before to reach the tanDelta peak temperature with slope superior to 0.16/° C. and finally a sharp reduction of elastic modulus G' around the Tg with decrease in G' of more than 40 MPa/° C.

Ex 1 and especially Ex 2 and Ex 3 show a very broad tanDelta peak with a high damping factor demonstrated by peak tanDelta value above 1. Ex 2 and Ex 3 also display a Tg above 0° C. that is most suitable for efficient damping around room temperature.

TABLE 4

Mechanical and melt properties of pure bock copolymers.

| Example ID | Tensile strength (MPa) | Tensile EaB (%) | M100 (MPa) | Hardness (3 s) (ShoreA) | MFR (dg/min) |
|---|---|---|---|---|---|
| Ex 1 | 19.2 | 1160 | 0.9 | NM | NM |
| Ex 3 | 16.6 | 625 | 1.4 | 50 | 22 |
| Comp Ex2 | 34 | 660 | 2.6 | 65 | <1 |
| Comp Ex 3 | 22 | 1400 | 1.6 | 44 | 2.5** |
| Comp Ex 4 | 13.1 | 780 | 1.7 | 51 | 7 |

Tensile EaB: Tensile elongation at break.
M100: Tensile modulus at 100% elongation.
**MFR is measured at 200° C. under 5 kg load.
NM: Not measured.

Both Ex 1 and Ex 3 display high a tensile strength of above 15 MPa. Ex 3 SBC displays in addition a high melt flow rate of MFR of 22 dg/min.

TABLE 5

TanDelta values for the composition of Ex 6 as extracted from the nomogram shown in FIG. 1.

| | Damping factor (tanDelta) at frequency (Hz) | | | |
|---|---|---|---|---|
| Temperature | 10 Hz | 100 Hz | 1000 Hz | 10000 Hz |
| 0° C. | 0.76 | 0.52 | 0.35 | 0.25 |
| 10° C. | 1.38 | 1 | 0.65 | 0.43 |
| 20° C. | 0.92 | 1.4 | 1.13 | 0.72 |
| 30° C. | 0.45 | 0.95 | 1.42 | 1.15 |
| 40° C. | 0.25 | 0.5 | 1.08 | 1.42 |

Ex 6 (composed of 100 parts of Ex 3+10 parts of Oil, P352) demonstrates the impressive damping capacity over a large range of temperatures and frequencies of the polymer according to the invention. Efficient sound damping requires high Delta values for the audible sounds (10-10000 Hz) at the typical application temperatures. Ex6 displays damping factor above or equal to 0.25 for the all that frequency range in the 0° C. till 40° C. temperature range and above 0.43 in the 10 till 30° C. temperature range. The Ex6 elastic modulus in that range of condition is always above 0.5 MPa indicating good modulus/hardness performance Ex 5 and Ex 6 demonstrate the possibility to mix some rubber miscible resin or plasticizing oil to boost the tanDelta value. This allows also to adapt the tanDelta peak temperature to higher values with the resin and lower values with the plasticizing oil. At these low level of addition, this does not reduce too much the strength and modulus of the block copolymer and it keeps the broad aspect of the tanDelta peak.

Figure 2:
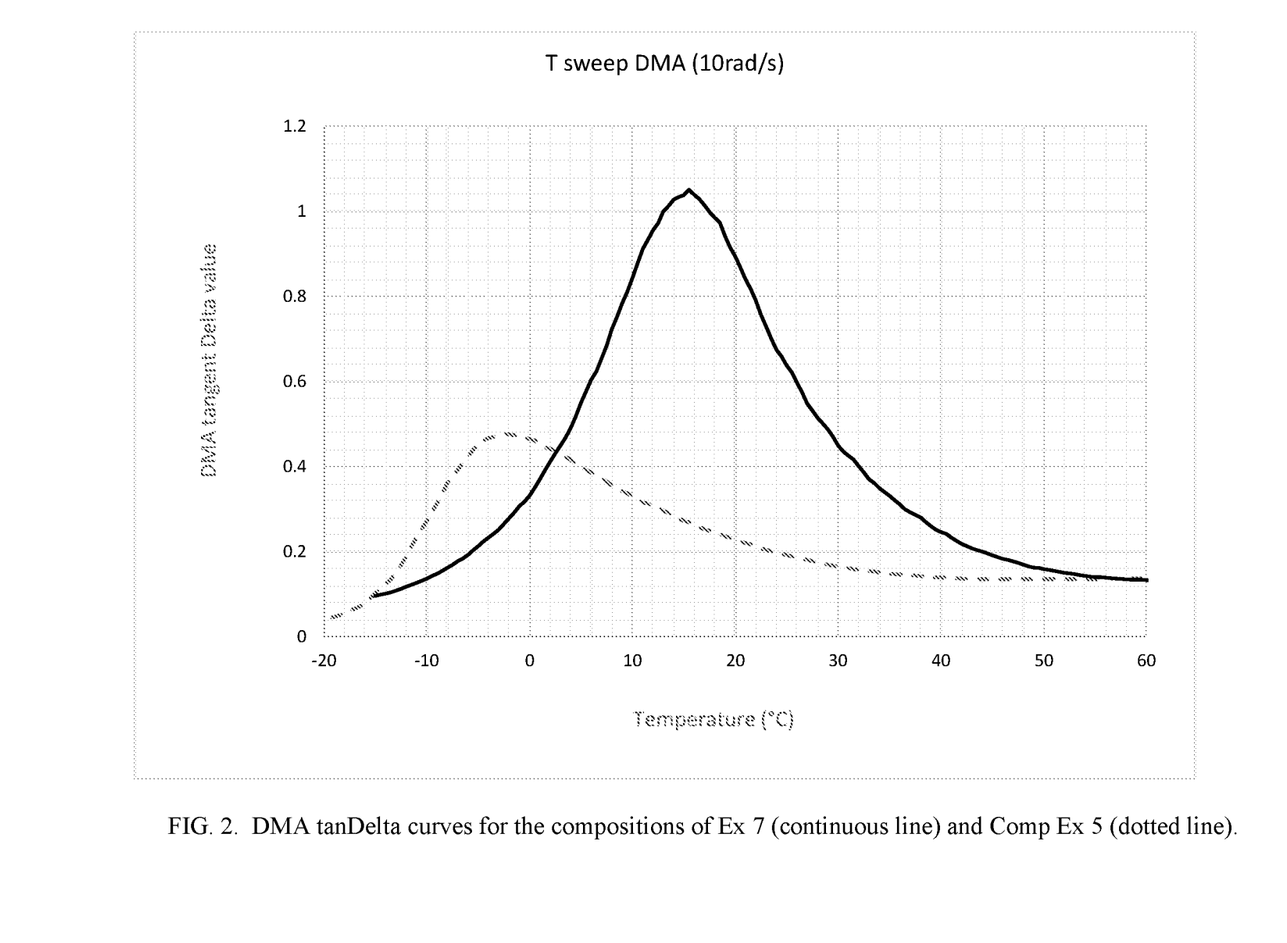
FIG. 2 shows the DMA tanDelta curves for the compositions of Ex 7 (continuous line) and Comp Ex 5 (dotted line).

The comparison of the DMA behavior of Ex 7 with Comp Ex 5 is displayed in FIG. 2, which shows that the damping characteristics of Ex 7 is superior to that of Comp Ex 5. Ex 5 shows a quite higher peak value and also shows high damping characteristics over a wider temperature range.

Ex 7 displays despite high addition level of polypropylene exceptional damping characteristics both in maximum damping factor but also in term of broad temperature range with high damping factor. Table 6 also demonstrates the high strength, high hardness and high melt flow in addition to above described surprising damping factor.

TABLE 7

Formulated block copolymer composition and other properties

| Example ID | Tensile strength (MPa) | Tensile EaB (%) | M100 (MPa) | Hardness (3 s) ShoreA | MFR dg/min |
|---|---|---|---|---|---|
| Ex 7 | 17.9 | 560 | 7.7 | 85 | 19 |
| Comp Ex 5 | 18.1 | 655 | 5.8 | 89 | 8 |

TABLE 8

Composition and properties of adhesive Compositions based on the SBCs.

| Ingredients | Units | Ex 8 | Comp Ex 6 |
|---|---|---|---|
| P1 | parts | 100 | |
| Comp Ex 1 | parts | | 100 |
| Piccotac 1095 | parts | 100 | 95 |
| Nyflex 223 | parts | 40 | 45 |
| Irganox 1010 | parts | 3 | 3 |
| PSA BC content | Wt. % | 41.2 | 41.2 |
| PSA coating weight | g/m2 | 25 | 25 |
| 180° PA on SS | N/25 mm | 19 | 18 |

TABLE 6

Formulated block copolymer composition and damping DMA properties.

| Ex/CompEx | Composition | Peak tanDelta value | tanDelta peak temp ($T_g$) (° C.) | ΔT ($T_g - T_{G''max}$) (° C.) | tanDelta at ($T_g - 20$) value | dG'/dT (MPa/° C.) MPa/° C. |
|---|---|---|---|---|---|---|
| Ex 5 | 100 p Ex 3 + 30 p Esc5400 | 1.78 | 23.7 | 19.0 | 0.29 | −26 |
| Ex 6 | 100 p Ex 3 + 10 p P352 | 1.41 | 5.7 | 22.0 | 0.30 | −24 |
| Ex 7 | Ex 3/PP 70% w/30% w | 1.04 | 15.7 | 16.9 | 0.22 | −30 |
| Comp Ex 5 | Comp Ex 4/PP 70% w/30% w | 0.48 | −1.3 | 7.0 | 0.03 | −68 |

TABLE 8-continued

Composition and properties of adhesive
Compositions based on the SBCs.

| Ingredients | Units | Ex 8 | Comp Ex 6 |
|---|---|---|---|
| HP on SS at RT (½ inch²/2 Kg) | min | >6000 | 2671 |
| HP on SS at 95° C. (1 inch²/1 kg) | min | >6000 | 4221 & >6000 |

PSA: Pressure Sensitive Adhesive.
PA: Peel Adhesion.
SS: Stainless Steel.
RT: Room Temperature.
HP: Holding Power.

From Table 8, it can be seen that the composition of Ex 8 shows superior holding power as shown by the 180° peel adhesion on stainless steel. Further, the shear resistance expressed by the holding power is maintained at the same high level of greater than 6000 minutes (abbreviated min) both at room temperature and at 95° C. To enable comparison, the two formulations were adjusted slightly so as to have comparable rubber phase Tg values. The good peel adhesion and superior resistance to shear illustrates that the SBCs disclosed herein are valuable for producing high performing adhesive formulations.

Examples 9-11

Different compositions having formulations shown in Table 9 were prepared. Chemicals other than sulfur and a vulcanization accelerator were kneaded in a 0.2 L enclosed mixer, set to a temperature at the discharge of 150° C., for 5.5 minutes to obtain a kneaded product. Then the kneaded product was re-milled for 4 minutes up to a temperature of 145° C. Then, the kneaded product, sulfur and the vulcanization accelerator were mixed using the same mixer for 2 minutes until the temperature reached 100° C. to obtain an un-vulcanized rubber composition, which was then formed. Rubber sample preparation for testing was done according to ISO 23529:2010.

TABLE 9

Curable rubber compositions based on the SBCs. Amounts are in phr.

| Ingredients | Comp Ex 7 | Ex 9 | Ex 10 | Ex 11 |
|---|---|---|---|---|
| Oiled extended solution styrene butadiene rubber | 48.12 | 20.6 | 48.12 | 48.12 |
| High-cis 1:4 polybutadiene | 30 | 30 | 30 | 30 |
| Solution styrene butadiene rubber | 35 | 35 | 35 | 35 |
| Ex2 | 0 | 20 | 20 | 0 |
| Ex3 | 0 | 0 | 0 | 20 |
| TDAE oil | 20 | 27.5 | 20 | 20 |
| Silica surface area of 175 m2/g | 80 | 80 | 80 | 80 |
| Carbon black surface area 118 m2/g | 5 | 5 | 5 | 5 |
| Bis[3-(triethoxysilyl)propyl]polyfulide | 8 | 8 | 8 | 8 |
| Zinc oxide | 3 | 3 | 3 | 3 |
| stearic acid | 2 | 2 | 2 | 2 |
| Antioxidant CAS# 000101-72-4 | 1 | 1 | 1 | 1 |
| Antioxidant CAS# 000793-24-8 | 2 | 2 | 2 | 2 |
| Antioxidant Acetoanil polymer | 0.5 | 0.5 | 0.5 | 0.5 |
| Blend of paraffins and microwaxes | 1 | 1 | 1 | 1 |
| N-cyclohexyl-2-benzothiazolesulfenamide | 1.52 | 1.52 | 1.8 | 1.52 |
| Diphenyl guanidine | 2 | 2 | 2.4 | 2 |
| Modified polymeric sulfur | 1.495 | 1.495 | 1.800 | 1.495 |

Test Methods & Indicators: DMA properties by a temperature-sweep in double shear mode from −60° C. to 100° C. with 1° C./min at 10 Hz and 0.1% (−60° C. till −5° C.) and 3% (−5° C. till 100° C.) dynamic strain were measured using a Metravib +450N. Other test indicators included: wet grip indicator—tan delta at 0° C. (tan δ 0° C.), dry grip indicator—tan delta at 30° C. (tan δ 30° C.), rolling resistance indicator—tan delta at 60° C. (tan δ 60° C.), dry handling indicator—storage modulus at 30° C. (G' 30° C.), and 90° C. Elasticity—tan delta at 90° C. (tan δ 90° C.). Various indices are calculated based on the reference formulation, with high values giving better performance.

TABLE 10

Cured rubber compositions properties.

| Indices | Comp Ex 7 | Ex 9 | Ex 10 | Ex 11 |
|---|---|---|---|---|
| Wet Grip index | 100 | 140 | 130 | 125 |
| Dry Grip index | 100 | 134 | 108 | 97 |
| Dry Handling index | 100 | 113 | 85 | 84 |
| Rolling resistance index | 100 | 84 | 105 | 108 |
| 90° C. Elasticity index | 100 | 93 | 115 | 102 |
| Tensile Strength index | 100 | 89 | 96 | 99 |

Examples 9, 10 and 11 demonstrate significant improvements in wet grip compared to the reference CompEx7. Ex9 and Ex10 also demonstrate improved dry grip. Ex9 and Ex10 indicate the possibility that the balance between "dry handling" versus rolling resistance performance can be achieved via the SBC addition strategy, by replacing part of the rubber with the block copolymer disclosed herein, or adding the block copolymer on top of the 100 phr of rubber, wherein the curative content is adapted to the unsaturated rubber content. Ex10 demonstrates a surprising set of improvements in Wet Grip, Dry Grip, Rolling Resistance, and 90° C. Elasticity.

Embodiments herein include:

1. A block copolymer comprising at least one block A and at least one block B, wherein the block "A" is a poly (vinylaromatic) block having a molecular weight of greater than 5 kg/mol; and the block "B" is a rubber block comprising polymerized units derived from a 1,3-diene and a vinylaromatic compound, and having a molecular weight greater than 15 kg/mol; wherein in the block B, the polymerized units derived from the vinylaromatic compound represent 5 to 40 wt. % of the overall weight of the block "B"; and the polymerized units derived from the 1,3-diene comprise more than 80 wt. % of polymerized isoprene units, wherein 45-80 mol % of the polymerized isoprene units are 1,4-addition units; wherein the block "A" represents from more than 5 wt. % to less than 40 wt. % of the overall block copolymer; and the block "B" represents from more than 33 wt. % to less than 95 wt. % of the overall block copolymer; and further wherein the block copolymer exhibits (i) an aromatic blockiness index, as measured by 1-H NMR, of more than 15% to less than 80%; (ii) a rubber phase maximum damping factor of more than 1; and (iii) a temperature corresponding to the rubber phase maximum damping factor of greater than −30° C.; the properties (ii) and (iii) can be measured with a dynamic mechanical analyzer at 10 rad/s according to ASTM D4065 in shear mode using a plate tool.

2. The block copolymer of Claim 1, wherein the block copolymer has one or more of structures A-B, A-B-A, (A-B-A-)nX, and (A-B-)nX; wherein X is a residue of a coupling agent, and n is 1-30.

3. The block copolymer of Claim 1, further comprising a block D and having a structure A-D-B, A-D-B-A, A-D-B-D-A, (A-D-B-)nX, (A-D-B-A-)nX, or any combinations thereof; wherein 'D' is essentially a poly(1,3-diene) block comprising polymerized 1,3-diene units derived from an isoprenoid conjugated diene; X is a residue of a coupling agent, n is 1-30, and represents the number of polymer arms coupled to the terminus of the block "B" or the block "D"; the coupled block copolymers species (A-D-B-) nX, (A-B-D-)nX, or combinations thereof represent more than 20 wt. % of the overall weight of the block copolymer; the block A represents from more than 5 wt. % to less than 40 wt. % of the overall weight of the block copolymer, the block B represents from more than 33 wt. % to less than 90 wt. % of the overall weight of the block copolymer, and further wherein the block copolymer exhibits (i) a difference of greater than 10° C. between the temperature corresponding to the rubber phase maximum damping factor and the temperature corresponding to a rubber phase maximum loss modulus; and (ii) a rubber phase maximum damping factor (tanDelta) of more than 1.1; the properties (i) and (ii) can be measured with a dynamic mechanical analyzer at 10 rad/s according to ASTM D4065 in shear mode using a plate tool.

4. The block copolymer of Claim 1, wherein the block A has a GPC molecular weight from 9 kg/mol to 40 kg/mol.

5. The block copolymer of Claim 3, wherein the block D has a GPC molecular weight from 3 kg/mol to 50 kg/mol.

6. The block copolymer of Claim 3, wherein the block D has more than 50 mol % of the polymerized 1,3-diene units as 1,4-addition units.

7. The block copolymer of Claim 3, wherein the block D has more than 80 mol % of the polymerized 1,3-diene units as 1,4-addition units.

8. The block copolymer of Claim 3, wherein the block A is a polystyrene block, the block D is a polyisoprene block.

9. The block copolymer of Claim 3, wherein the block copolymer exhibits: a rubber phase maximum damping factor of more than 1.2, a temperature corresponding to the rubber phase maximum damping factor of from above −10° C. to below +30° C., a difference of greater than 15° C. between the temperature corresponding to the rubber phase maximum damping factor and the temperature corresponding to a rubber phase maximum loss modulus, and a maximum absolute change in elastic modulus (G') of less than 40 MPa per ° C.; all properties can be measured with a dynamic mechanical analyzer at 10 rad/s according to ASTM D4065 in shear mode using a plate tool.

10. The block copolymer of Claim 8, wherein 50-75 mol % of the polymerized isoprene based are 1,4-addition units; and wherein the block copolymer exhibits: a temperature corresponding to the rubber phase maximum damping factor of from above 0° C. to below +20° C.; and a rubber tanDelta peak temperature above 0° C. and below +20° C.

11. The block copolymer of Claim 2, having one or more of structures A-B-A, (A-B-A-)nX, and (A-B-)mX, wherein when m >1, the one or more structures represents from 75 wt. % to 100 wt. % of the overall weight of the block copolymer; and wherein the block copolymer exhibits a tensile strength of greater than or equal to 15 MPa, measured according to ASTM D412.

12. The block copolymer of Claim 3, having one or more of structures A-D-B-A, A-D-B-D-A, (A-D-B-)pX, (A-D-B-A-)nX, or any combinations thereof, wherein when p is greater than 1, the one or more structures represents from 75 wt. % to 100 wt. % of the overall weight of the block copolymer; and wherein the block copolymer exhibits a tensile strength of greater than or equal to 15 MPa, measured according to ASTM D412.

13. A selectively hydrogenated form of the block copolymer of Claim 1.

14. A selectively hydrogenated form of the block copolymer of Claim 3.

15. The selectively hydrogenated block copolymer of Claim 13, wherein more than 80 mol % of the double bonds in the polymerized 1,3-diene units in blocks B are hydrogenated, and wherein less than 30 mol % of the aromatic ring double bonds are hydrogenated.

16. The selectively hydrogenated block copolymer of Claim 14, wherein more than 92 mol % of the double bonds in the polymerized 1,3-diene units in blocks B and D are hydrogenated, and wherein less than 20 mol % of the aromatic ring double bonds are hydrogenated.

17. The block copolymer of Claim 1, wherein the block copolymer further comprises a functional group selected from the group consisting of OH, halogeno, and $SO_3Y$, wherein Y is a metal cation, H, alkoxy, aryloxy; acid anhydride, or $CO_2Z$, wherein Z is a metal cation, H, alkoxy, or aryloxy.

18. A blend comprising the block copolymer of Claim 1.

19. The blend of Claim 18, wherein said blend is used in vibration damping, adhesives, labels, sealants, seals, films, coatings, toys, shoe parts, wire and cables, medical goods, packaging and sports goods.

20. The block copolymer of Claim 1, wherein the blocks "A" and "B" comprise polymerized units derived from one or more vinylaromatic compounds having a formula wherein R1 is H or $CH_3$; and R2 is H, alkyl or aryl.

21. A selectively hydrogenated form of the block copolymer of Claim 20.

22. A blend comprising the block copolymer of Claim 20, or a hydrogenated form thereof.

23. A composition comprising: 100 parts by weight of the blend of Claim 18, 1-500 parts by weight in total of a paraffinic oil, a naphthenic oil, a natural oil, a tackifying resin, or combinations thereof and optionally a thermoplastic polymer and/or a filler.

24. The blend of Claim 23, further comprising one or more of an antioxidant, a dye, a colorant masterbatch, a flame retardant (solid or liquid), a foaming agent, a UV stabilizer, a wax, a surface agent, a rheology modifier, and an aromatic resin.

25. The blend of Claim 23, wherein the thermoplastic polymer is selected from the group consisting of a polyolefin, a thermoplastic elastomer, an aromatic polyether, and combinations thereof; and wherein the filler is selected from the group consisting of calcium carbonate, talc, mica, magnesium hydroxide, aluminum hydroxide, barium sulfate, and combinations thereof.

26. A composition comprising, per 100 parts of the composition: 1 to 99 parts by weight of the blend of Claims 22, 99 to 1 parts by weight of at least one rubber, and up to 1000 parts by weight per 100 parts by weight of the sum of (i) and (ii) of one or more of a filler, a plasticizer, a resin, and an additive.

27. The composition of Claim 26, further comprising a curing agent package.

28. An article prepared from a cured composition obtained by curing the composition of Claim 27.

29. The composition of Claim 27, comprising, based on the overall weight of the composition: 100 parts by weight of an elastomeric composition, 50 to 200 parts by weight of a filler, 0.1 to 20 parts by weight, of a curative, and up to 70 parts by weight of a plasticizer or a resin; wherein the elastomeric composition comprises 5 to 50 parts by weight of the block copolymer of Claims 22, and 5 to 95 parts by weight of a rubber, based on the total weight of the elastomeric composition.

30. A vibration damping composition comprising, per 100 parts of the composition: 100 parts by weight of the block copolymer of Claim 13, 5-80 parts by weight of a propylene-based polymer, and less than 40 parts by weight of a paraffinic oil, a naphthenic oil, a natural oil, or a tackifying resin; wherein the composition exhibits: a temperature corresponding to the rubber phase maximum damping factor of from −5° C. to +20° C., a rubber phase maximum damping factor of more than 0.8, and a difference of greater than 10° C. between the temperature corresponding to the rubber phase maximum damping factor and the temperature corresponding to a rubber phase maximum loss modulus; all measured with a dynamic mechanical analyzer at 10 rad/s according to ASTM D4065 in shear mode using a plate tool.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A block copolymer comprising at least one block A and at least one block B,
    wherein the block "A" is a poly(vinylaromatic) block having a molecular weight of greater than 5 kg/mol; and
    the block "B" is a rubber block comprising polymerized units derived from a 1,3-diene and a vinylaromatic compound, and having a molecular weight greater than 15 kg/mol;
    wherein in the block B,
        the polymerized units derived from the vinylaromatic compound represent 5 to 40 wt. % of the overall weight of the block "B"; and
        the polymerized units derived from the 1,3-diene consisting of polymerized isoprene units, wherein 45-80 mol % of the polymerized isoprene units are 1,4-addition units;
    wherein the block "A" represents from more than 5 wt. % to less than 40 wt. % of the overall block copolymer; and
        the block "B" represents from more than 33 wt. % to less than 95 wt. % of the overall block copolymer; and
    further wherein the block copolymer exhibits:
    (i) an aromatic blockiness index, as measured by 1-H NMR, of more than 15% to less than 80%;
    (ii) a rubber phase maximum damping factor of more than 1;
    (iii) a temperature corresponding to the rubber phase maximum damping factor of greater than −30° C.; and
    (iv) a difference of greater than 15° C. between the temperature corresponding to the rubber phase maximum damping factor and a temperature corresponding to a rubber phase maximum loss modulus.

2. The block copolymer of claim 1, wherein the block copolymer has one or more of structures A-B, A-B-A, (A-B-A-)nX, and (A-B-)nX; wherein X is a residue of a coupling agent, and n is 1-30.

3. The block copolymer of claim 2, having one or more of structures A-B-A, (A-B-A-)nX, and (A-B-)mX, wherein when m>1, the one or more structures represents from 75 wt. % to 100 wt. % of the overall weight of the block copolymer;

and wherein the block copolymer exhibits a tensile strength of greater than or equal to 15 MPa, measured according to ASTM D412.

4. The block copolymer of claim 1, further comprising a block D and having a structure A-D-B, A-D-B-A, A-D-B-D-A, (A-D-B-)nX, (A-D-B-A-)nX, or any combinations thereof;
wherein
'D' is essentially a poly(1,3-diene) block comprising polymerized 1,3-diene units derived from an isoprenoid conjugated diene;
X is a residue of a coupling agent;
n is 1-30, and represents the number of polymer arms coupled to the terminus of the block "B" or the block "D" in a coupled block copolymer;
the coupled block copolymers species (A-D-B-)nX, (A-B-D-)nX, or combinations thereof represent more than 20 wt. % of the overall weight of the block copolymer;
the block A represents from more than 5 wt. % to less than 40 wt. % of the overall weight of the block copolymer;
the block B represents from more than 33 wt. % to less than 90 wt. % of the overall weight of the block copolymer; and
further wherein the block copolymer exhibits one or more of:
(i) a difference of greater than 15° C. between the temperature corresponding to the rubber phase maximum damping factor and the temperature corresponding to a rubber phase maximum loss modulus;
(ii) a rubber phase maximum damping factor (tanDelta) of more than 1.1;
(iii) a temperature corresponding to the rubber phase maximum damping factor of from above −10° C. to below +30° C.; and
(iv) a maximum absolute change in elastic modulus (G') of less than 40 MPa per ° C.

5. The block copolymer of claim 4, wherein the block D has a GPC molecular weight from 3 kg/mol to 50 kg/mol.

6. The block copolymer of claim 4, wherein the block D has more than 50 mol % of the polymerized 1,3-diene units as 1,4-addition units.

7. The block copolymer of claim 4, wherein the block A is a polystyrene block, the block D is a polyisoprene block.

8. The block copolymer of claim 4, wherein the block copolymer exhibits a rubber phase maximum damping factor of more than 1.2.

9. The block copolymer of claim 8, wherein 50-75 mol % of the polymerized isoprene based are 1,4-addition units; and wherein the block copolymer exhibits:
a temperature corresponding to the rubber phase maximum damping factor of from above 0° C. to below +20° C.;
and a rubber tanDelta peak temperature above 0° C. and below +20° C.

10. The block copolymer of claim 1, wherein the block A has a GPC molecular weight from 9 kg/mol to 40 kg/mol.

11. The block copolymer of claim 4, having one or more of structures A-D-B-A, A-D-B-D-A, (A-D-B-)pX, (A-D-B-A-)nX, or any combinations thereof, wherein when p is greater than 1, the one or more structures represents from 75 wt. % to 100 wt. % of the overall weight of the block copolymer; and
wherein the block copolymer exhibits a tensile strength of greater than or equal to 15 MPa, measured according to ASTM D412.

12. The block copolymer of claim 4, wherein the block copolymer is selectively hydrogenated,
wherein more than 92 mol % of the double bonds in the polymerized 1,3-diene units in blocks B and D are hydrogenated, and
wherein less than 20 mol % of the aromatic ring double bonds are hydrogenated.

13. The block copolymer of claim 1, wherein the block copolymer is selectively hydrogenated,
wherein more than 80 mol % of the double bonds in the polymerized 1,3-diene units in blocks B are hydrogenated,
and wherein less than 30 mol % of the aromatic ring double bonds are hydrogenated.

14. The block copolymer of claim 1, wherein the block copolymer further comprises a functional group selected from the group consisting of OH, halogeno, and $SO_3Y$, wherein Y is a metal cation, H, alkoxy, aryloxy; acid anhydride, or $CO_2Z$, wherein Z is a metal cation, H, alkoxy, or aryloxy.

15. An article comprising the block copolymer of claim 1, wherein the article is used for any of vibration damping, adhesives, labels, sealants, seals, films, coatings, toys, shoe parts, wire and cables, medical goods, packaging, and sports goods.

16. The block copolymer of claim 1, wherein the blocks "A" and "B" comprise polymerized units derived from one or more vinylaromatic compounds having a formula wherein R1 is H or $CH_3$; and R2 is H, alkyl or aryl,
wherein the block copolymer is hydrogenated or unhydrogenated.

17. The block copolymer of claim 16, wherein the block copolymer is a selectively hydrogenated form of the block copolymer.

18. A composition comprising:
100 parts by weight of the block copolymer of claim 16,
1-500 parts by weight in total of a paraffinic oil, a naphthenic oil, a natural oil, a tackifying resin, or combinations thereof;
and optionally a thermoplastic polymer and/or a filler.

19. A composition comprising, per 100 parts of the composition:
(i) 1 to 99 parts by weight of the block copolymer of claim 16,
(ii) 99 to 1 parts by weight of at least one rubber, and
(iii) up to 1000 parts by weight per 100 parts by weight of the sum of (i) and (ii) of one or more of a filler, a plasticizer, a resin, and an additive.

20. An article prepared from the composition of claim 19.

21. A composition comprising, based on the overall weight of the composition:
100 parts by weight of an elastomeric composition, 50 to 200 parts by weight of a filler, 0.1 to 20 parts by weight, of a curative, and up to 70 parts by weight of a plasticizer or a resin;
wherein the elastomeric composition comprises 5 to 50 parts by weight of the block copolymer of claims 16, and 5 to 95 parts by weight of a rubber, based on the total weight of the elastomeric composition.

22. A vibration damping composition comprising, per 100 parts of the composition:
100 parts by weight of the block copolymer of claim 1 or a selectively hydrogenated form thereof,
5-80 parts by weight of a propylene-based polymer, and less than 40 parts by weight of a paraffinic oil, a naphthenic oil, a natural oil, or a tackifying resin;
wherein the vibration damping composition exhibits:
a temperature corresponding to the rubber phase maximum damping factor of from −5° C. to +20° C.,
a rubber phase maximum damping factor of more than 0.8, and
a difference of greater than 10° C. between the temperature corresponding to the rubber phase maximum damping factor and the temperature corresponding to a rubber phase maximum loss modulus.

23. A block copolymer comprising at least one block A, at least one block B, and a block D, having a structure A-D-B, A-D-B-A, A-D-B-D-A, (A-D-B-)nX, (A-D-B-A-)nX, or any combinations thereof;
wherein the block "A" is a poly(vinylaromatic) block having a molecular weight of greater than 5 kg/mol;
wherein the block "B" is a rubber block comprising polymerized units derived from a 1,3-diene and a vinylaromatic compound, and having a molecular weight greater than 15 kg/mol;
wherein in the block "B",
the polymerized units derived from the vinylaromatic compound represent 5 to 40 wt. % of the overall weight of the block "B"; and
the polymerized units derived from the 1,3-diene consisting of polymerized isoprene units, wherein 45-80 mol % of the polymerized isoprene units are 1,4-addition units;
wherein the block "D" is essentially a poly(1,3-diene) block comprising polymerized 1,3-diene units derived from an isoprenoid conjugated diene; and
wherein the block "A" represents from more than 5 wt. % to less than 40 wt. % of the overall block copolymer; the block "B" represents from more than 33 wt. % to less than 95 wt. % of the overall block copolymer; X is a residue of a coupling agent; and n is 1-30, and represents the number of polymer arms coupled to the terminus of the block "B" or the block "D" in a coupled block copolymer;
the coupled block copolymers species (A-D-B-)nX, (A-B-D-)nX, or combinations thereof represent more than 20 wt. % of the overall weight of the block copolymer;
further wherein the block copolymer exhibits:
(i) an aromatic blockiness index, as measured by 1-H NMR, of more than 15% to less than 80%;
(ii) a rubber phase maximum damping factor of more than 1;
(iii) a temperature corresponding to the rubber phase maximum damping factor of greater than −30° C.; and
(iv) a difference of greater than 15° C. between the temperature corresponding to the rubber phase maximum damping factor and a temperature corresponding to a rubber phase maximum loss modulus.

* * * * *